(12) United States Patent
Jensen

(10) Patent No.: US 6,360,141 B1
(45) Date of Patent: Mar. 19, 2002

(54) SYSTEM FOR ESTABLISHING AUTOMATIC ACCESS TO FUEL UPRIGHT AND METHOD FOR FILLING UP OF A VEHICLE

(75) Inventor: Anders Buus Jensen, Aalborg (DK)

(73) Assignee: Metax-Olie A/S, Aalborg (DK)

( * ) Notice: Subject to any disclaimer, the term of this patent is extended or adjusted under 35 U.S.C. 154(b) by 0 days.

(21) Appl. No.: 09/424,696
(22) PCT Filed: May 22, 1998
(86) PCT No.: PCT/DK98/00209
§ 371 Date: Feb. 2, 2000
§ 102(e) Date: Feb. 2, 2000
(87) PCT Pub. No.: WO98/54678
PCT Pub. Date: Dec. 3, 1998

(30) Foreign Application Priority Data

May 26, 1997 (DK) .............................................. 0596/97

(51) Int. Cl.⁷ .............................................. G06F 17/00
(52) U.S. Cl. ...................... 700/237; 700/236; 700/241; 700/244; 704/175
(58) Field of Search ............................... 700/236, 241, 700/244, 237; 704/175

(56) References Cited

U.S. PATENT DOCUMENTS

| | | | | |
|---|---|---|---|---|
| 3,731,277 A | * | 5/1973 | Krutz et al. ................. 340/163 |
| 4,033,883 A | * | 7/1977 | Zinsmeyer et al. ......... 250/231 |
| 4,805,738 A | * | 2/1989 | Vayda .......................... 186/36 |
| 4,977,528 A | * | 12/1990 | Norris ..................... 364/571.01 |
| 5,297,423 A | * | 3/1994 | Keating et al. .............. 73/49.2 |
| 5,488,360 A | | 1/1996 | Ray |
| 5,586,050 A | * | 12/1996 | Makel et al. ................ 364/509 |
| 5,596,501 A | * | 1/1997 | Comer et al. ........... 364/464.23 |
| 5,612,890 A | * | 3/1997 | Strasser et al. ......... 364/479.11 |
| 5,859,779 A | * | 1/1999 | Giiordano et al. ..... 364/479.01 |
| 5,913,180 A | * | 6/1999 | Ryan ............................ 702/45 |
| 6,039,123 A | * | 3/2000 | Webb ........................... 169/45 |
| 6,045,040 A | * | 4/2000 | Streicher et al. ............ 235/381 |
| 6,112,174 A | * | 8/2000 | Wakisaka et al. ........... 704/251 |
| 6,116,298 A | * | 9/2000 | Haimovich et al. ........... 141/94 |
| 6,128,551 A | * | 10/2000 | Davis et al. ................. 700/236 |
| 6,157,871 A | * | 12/2000 | Terranova .................... 700/231 |
| 6,216,790 B1 | * | 4/2001 | Webb ........................... 169/45 |

FOREIGN PATENT DOCUMENTS

| | | |
|---|---|---|
| EP | 0708547 | 4/1996 |
| WO | WO 9319004 | 9/1993 |

* cited by examiner

*Primary Examiner*—Christopher P. Ellis
*Assistant Examiner*—Michael E. Butler
(74) *Attorney, Agent, or Firm*—Kilpatrick Stockton LLP

(57) ABSTRACT

System for establishing autonatic access to a fuel pump comprising at least one decentral control unit (3), said control unit (3) comprising means which regulate the fuel pumps (7) associated with a service station, and a central control unit (2), at least one of the control units (2, 3) comprising means which are activated by wireless signals transmitted from a mobile telephone, said means comprising central means for the linking together of a first unique code (13) belonging to the mobile telephone (1) with the identification number of the same telephone, and the linking together of number and/or code (B) with the data lying in the unit, and that the decentral control unit comprises decentral means for the linking together of a second code (C), which is unique for the fuel pump and which is entered via the telephone, with the status associated with the pump, and which are activated by the wireless signals transmitted from the mobile telephone. There is hereby achieved a system with extra great security, and the system does not require the installation of card units at each individual station. The delivery and production of cards is also avoided.

8 Claims, 2 Drawing Sheets

Figure 1:
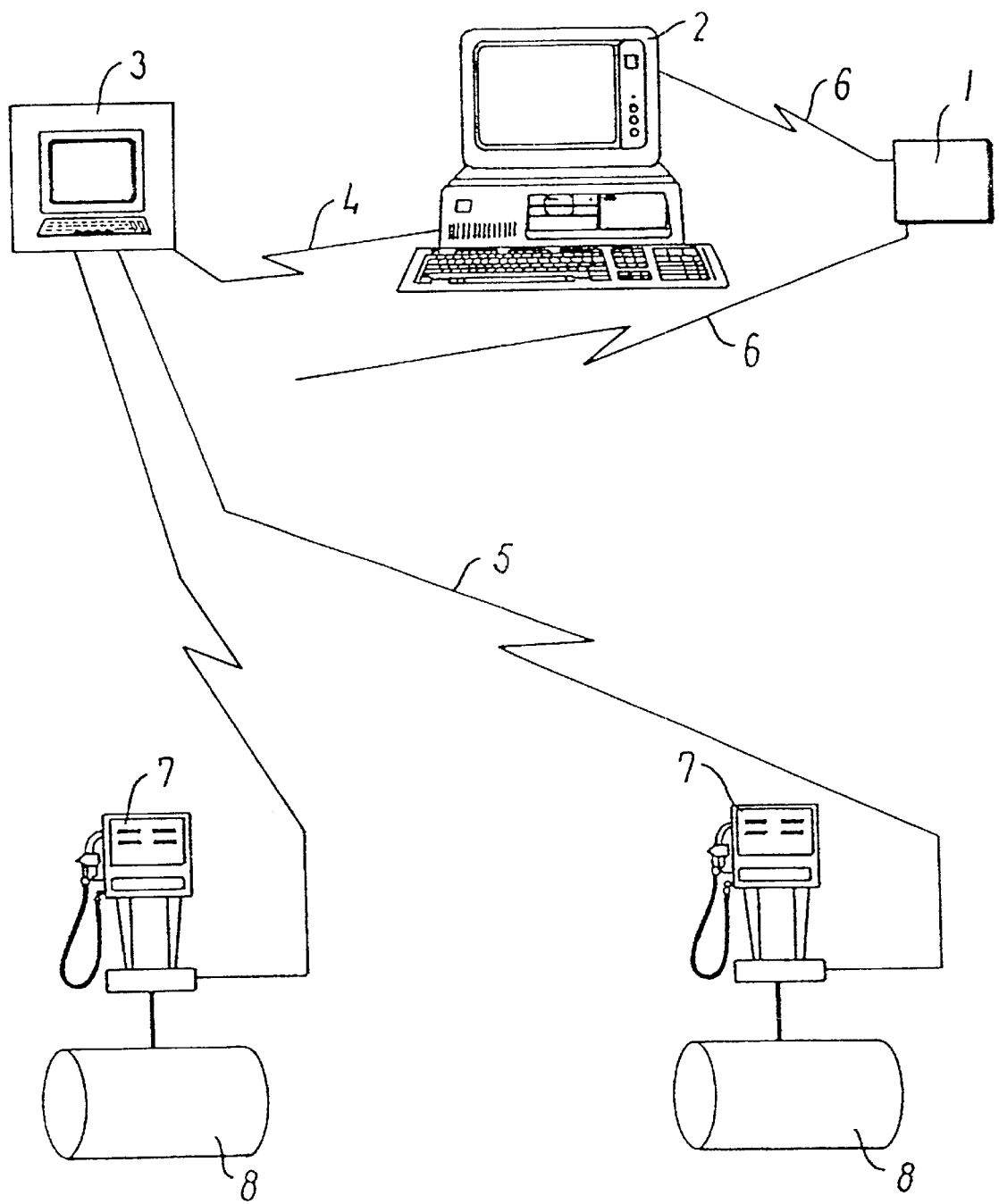

SYSTEM FOR ESTABLISHING AUTOMATIC ACCESS TO FUEL UPRIGHT AND METHOD FOR FILLING UP OF A VEHICLE

The invention concerns a system for establishing automatic access to fuel pumps comprising at least one decentral control unit, said control unit comprising means which regulate the fuel pumps associated with a service station, and a central control unit and method for the filling up of a vehicle with fuel comprising the entering of a second code for the activation of a fuel pump.

In the filling-up of vehicles with fuel, the system used at present is one whereby access to the fuel pump is established by use of a card and the entering of a code, and where payment takes place via the card's account and owner. Among other things, the method and the system suffers the disadvantage that the card is continuously subject to wear, which means that this must be replaced to the inconvenience of both the user and the fuel company. Moreover, the system necessitates the installation of keypad/scanning units at each individual station in order for the cards to be scanned. In addition, the user is required to enter data at said keypad units and must then carry out the filling-up from the pump itself, which especially at larger stations results in extra consumption of the user's time. Such a system is known for example from U.S. Pat. No. 4,395,627.

From WO-9319004 there is known a system for the filling up of cars with fuel, and where the car itself comprises means of communication, for example in the form of units coupled to a pedal, or a dedicated keyboard built into the car itself, and also where the service stations are provided with the receiver unit, for example in the form of a camera and a robot for the servicing of the car. Such a system is very advanced and also extremely expensive to establish for both the car owner as well as the individual service station, in that the system demands that each individual car has a unique communication unit which can find application in relation to those units which happen to exist at the service station itself.

The system makes it possible to activate the service station from inside the car itself, and to carry out a filling-up with fuel. The system does not provide the possibility of activation before arrival at the service station itself and, as mentioned above, it is a particularly advanced and very costly system.

It is the object of the invention to provide a system which is not encumbered with the disadvantages of the known systems.

By providing a system as discussed in the introduction, and where at least one of the control units comprises means which are activated by the wireless signals transmitted from a mobile telephone, said means comprising central means for the linking together of a first unique code (B) associated with the mobile telephone with the identification number of the same telephone, and the linking together of number and/or code (B) with the data lying in the unit, and where the decentral control unit comprises decentral means for linking a code which is unique for the fuel pump and a code (C) entered via the telephone with the status associated with the pump, and which are activated by the wireless signals transmitted from a mobile telephone, said decentral control unit controlling and activating the fuel pumps chosen, a very high degree of security is achieved in the use of the system, where the user is identified with 100% security, and where the use of cards at the individual service stations is avoided, while at the same time the necessity is also avoided of having to establish keyboard/scanning units at each individual service station for receipt of the card and the maintaining of other special mechanical aids. At the same time, the production and delivery of cards is also avoided, and thus the above-mentioned problem of wear on the cards does not exist. The system is very user-friendly and time-saving for the user, in that some of the data keying-in operations can take place before the user reaches the service station.

The way in which the system works, for example, is that the user drives to the service station and selects a fuel pump at which to fill up. The user then reads the unique number from the pump and enters this number on his mobile telephone, and the pump is made available after access to the system has been established. It is possible for the user, if he is in his car on the way to the service station, to activate his user status, so that when he reaches the station it is necessary only to enter the unique data for the pump/station. Moreover, a high degree of security is achieved in the system, in that most mobile telephones have a PIN code which must be entered before access can at all be gained to the telephone. Access to the system is achieved by entering a general code which is the entry key to the central control unit, this code being the same for all users. Thereafter, the user then enters his own specific first code, which is related to the telephone's identification number, which at present is the call number. As mentioned, there is hereby achieved great security in the system, in that here a validation is effected.

The validation is effected by the system examining whether the customer is known and hereafter whether the customer is on the blocking list. If the customer is known and is not on the blocking list, he can be validated positive. The examination of whether a customer is known takes place by comparing two parameters. 1: The customer's telephone number and 2: the customer's first unique code. In that the customer rings to a Main Computer Voice Response System (MCVRS), the customer's telephone number is automatically transferred to the MCVRS. This automatic transfer of the telephone number can not be falsified. MCVRS asks the customer to enter his first unique code. The customer enters his first unique code on his mobile telephone. This entry is picked up by MCVRS via the sound tones of the mobile telephone keys. In a database in the main computer there is a table of telephone numbers with associated first unique codes and further identification of the customer (account number, name, address etc.). If the customer's telephone number and first unique code are found in the table, the customer is known. The main computer then examines whether the customer is to be found on the blocking list, which similarly lies in the main computer's database. If this is not the case, the customer is validated positive. If the customer is found on the blocking list, he is validated negative. If the customer's telephone number is not in the telephone number table, he is validated negative. If the first unique code does not match with the telephone number, the customer is validated negative. In this case the MCVRS requests that a new first unique code be entered.

Alternatively, the validation can take place decentrally at the station's computer—the decentral control unit. If this solution is selected, the main computer—the central control unit—transmits the relevant data (telephone number, first unique code) via, e.g. the telephone network or other connection to the station's computer. The database containing the telephone number table, first unique code table and blocking list will then exist on the station's computer, and it is here that the examination takes place.

The second code is a specific identification number for the selected pump, comprising an X number of digits for the identification of the station, and a Y number of digits for the identification of the pump at the station.

The first unique code thus gives rise to a double system check, in that the selected code must be correct in relation to the telephone number of the telephone before a delivery of fuel can take place. The second code controls the extent to which a pump can be used, and which control unit is placed at the selected station. After the user has finished filling up, the data—including the amount of fuel and the price—will be registered in the central control unit via the decentral control unit, and the relevant amount will thus be recorded in the customer's account.

By providing a system according to the invention and as further disclosed in claim 2, it is achieved that a customer validation can be effected locally, which for example is relevant in connection with installations for haulage contractors.

By providing a system according to the invention and as further disclosed in claim 3, access is the same for all users and thus only a single central control unit is required.

By providing a system according to the invention and as further disclosed in claim 4 and 5, an expedient form of implementation is achieved for the establishing of a system according to the invention.

By providing a system according to the invention and as further disclosed in claim 6, the possibility is provided of being able to service the customer with data concerning, for example, fuel consumption over a given period and, if the user provides the system with data concerning his odometer, also information concerning fuel consumption as a function of the number of kilometres or miles which have been driven. If the user avails himself of such a possibility, it will also be possible for the central unit to calculate and to inform the user when the next service inspection will be necessary, and when there will be need for an oil check etc. The system is thus an interactive system, in that the information can be provided either by mail or via a message back over the telephone network. It is envisaged that use is preferably made of the GSM network, in that this is very difficult to break into, which as mentioned is important in a system which is to have optimum security.

The invention also concerns a method of filling-up of a vehicle with fuel, and as further disclosed in claim 7 and 8. It is hereby possible for a customer to activate his account before he reaches the service station, said activation taking place in the car, and whereby the user can key-in the code provided on the pump without having to move to automats other than precisely that pump at which he tanks up.

The pump is made available from the customers car, which means that during unfavourable weather conditions the customer can remain as long as possible in the warm car.

Figure 2:
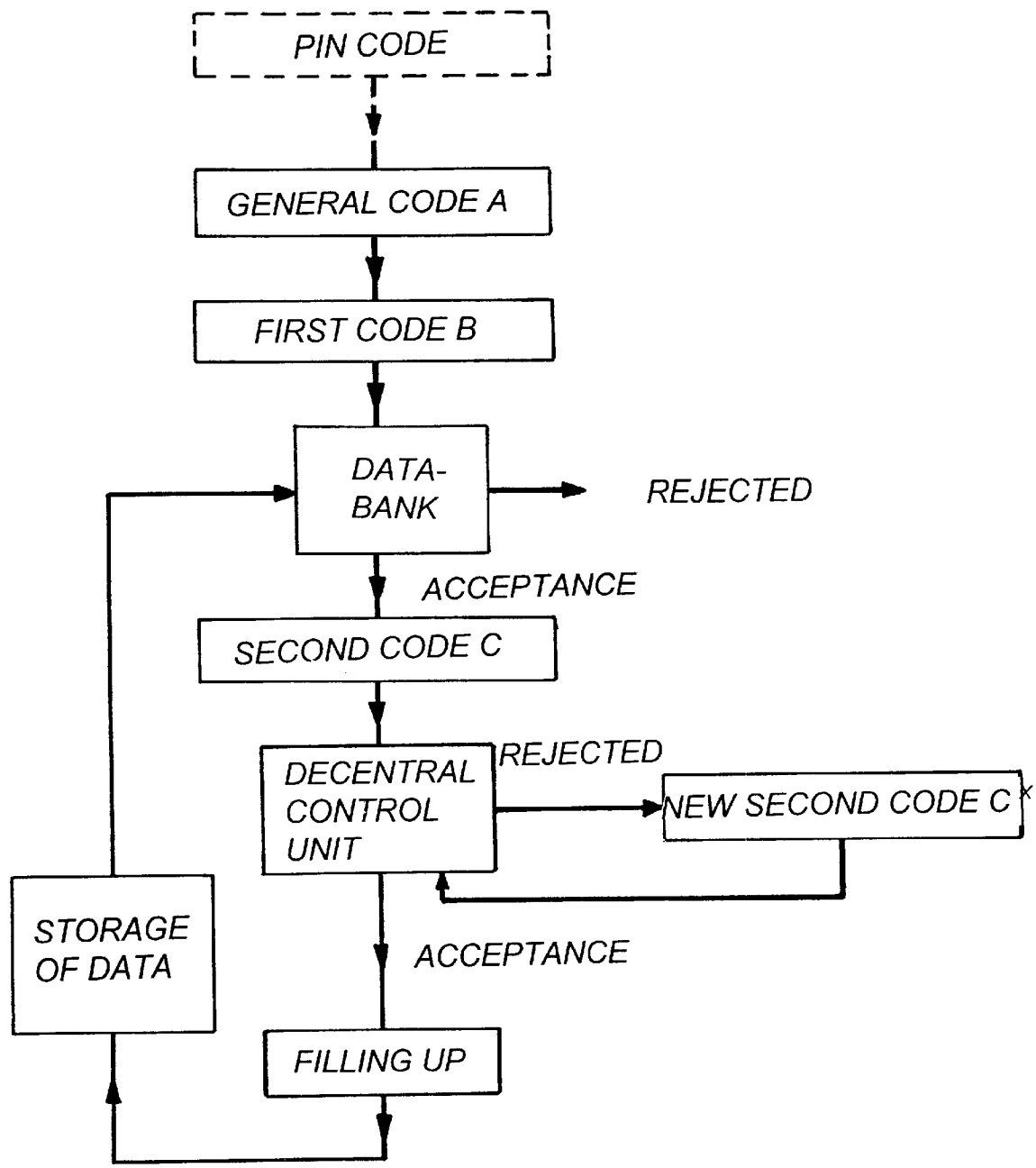

The invention will now be described in more detail with reference to the drawing, where FIG. 1 shows the individual components and parts of the system, and FIG. 2 shows a routing diagram for the method.

The system comprises a wireless signal transmitter 1, preferably a mobile telephone of the GSM type. This is chosen because the GSM network is a network which is practically speaking impossible to break into. The system also comprises a central control unit 2, said control unit comprising a computer, for example of the Pentium type, and which has a display and a code reader and a memory for storing and processing of data. It is envisaged that the central control unit will control all of the decentral units 3 which may be installed at the individual service stations around the country. The central control unit can be looked upon as being the brain of the system from which everything is coordinated, and which makes it possible for the customers, regardless of where in the country they may be situated, to carry out a filling-up of their vehicles.

On this computer there is installed a voice response system (MCVRS Main Computer Voice Response System) which answers the call and communicates with the customer. The system enables telephonic communication to take place between a user and a computer. The communication takes place by the computer repeating spoken sentences as speech. The user communicates either via speech or by using the telephone pushbuttons. Broadly speaking, the voice response system can be compared with an advanced telephone answering device which makes 2-way communication possible.

In principle, the voice response system is made up of various hardware and software. The hardware, which is installed on a standard computer, comprises a plug-in board which enables communication to take place via the telephone. The special feature compared with the more traditional modem connections is that the plug-in board can often handle more telephone connections and herewith more users simultaneously. Moreover, the plug-in board has a sound-reproduction part for repeating speech. The software part of the voice response system contains the spoken-in messages and handles all of the information which is exchanged between the user and the computer.

An alternative could be that instead of being installed on the main computer, the VRS is installed on the service station computer 3. This will mean that the customer must make a call directly to the relevant service station computer 3. This is a realistic alternative, but it will require that the customer knows the telephone numbers of all the service stations' voice response systems.

As mentioned, the decentral unit 3 is preferably installed out at the service stations themselves, and where the decentral unit controls the individual pumps, i.e. whether or not it is possible for the customer to activate the selected pump, in that the decentral unit checks whether or not the pump is free and whether there is fuel remaining in the underground tank 8 to which the pump is connected. The decentral unit 3 typically comprises a computer, though of a less powerful type than that required for the central control unit, and has an interface connection with the pumps in accordance with normal standards.

The connection between the central control unit and the decentral control unit 3 consists of an interface 4, and where the means typically comprise analogue or digital permanent net connections. The interface 5 between the decentral unit 3 and the pumps 7 is, as mentioned, of standard type. The individual pumps 7 are connected to the underground tanks 8 and function in accordance with the known principles.

The system could be configured as follows:

A central unit consisting of a standard PC with Intel Pentium processor. In the PC there is mounted a telephone card of the Retorex type, with the possibility of 4 ingoing lines. The PC's control system is Windows 95 with driver and voice response system software for the Retorex module. There is also installed a standard programme for the control and surveillance of all service stations. The programme is extended with the functions required for the handling of the GSM calls.

The service stations are controlled and supervised by a specially-designed computer system (decentral units) based on an Intel 186 processor. The software at the service stations is similarly specially-designed for the control and surveillance of, for example, 16 pumps and 8 payment units. This software is extended to handle functions in connection with GSM concepts.

The actual method for the activation of the system is illustrated in FIG. 2. The user, who thus has a GSM telephone, enters his PIN code, which is unique for the relevant telephone and known only by the user. Access is hereby obtained to the GSM network. The user then enters a general code A, this code A providing access to the system as a whole. The user then enters a first code B, which is unique for the user and thus provides access to the system only if this user code has been established in the system. The code provides access to the databank, which will either accept or reject the relevant code. This depends on the validation mentioned earlier, and which involves a linking-together of the code B and the identication number of the telephone. Providing that this is accepted, the user has activated the system and can now select the service station. The advantage is thus that all of these data entries can take place whenever desired by the customer.

When the customer reaches the relevant service station, he/she will enter a second code C, this second code C being a unique code for the relevant station. This code consists of some XX data which indicates the selected station. A station in one part of the country will thus have one unique code, while a station in another part of the country will have another unique code. The last digits indicate the pump at the relevant station. By having a code of this type it is hereby ensured that any pump can be identified with 100% security. This code is checked in the decentral control unit and, providing that the pump is free and that there is fuel at disposal, this will thus make the pump available for use. If there is no fuel at disposal, or the relevant pump is already being used or the user has entered an incorrect code, he/she will be rejected and a new second code must be entered. As soon as this is accepted, the user can begin filling up and the data which arise in connection with this filling will go back to the databank in the decentral control unit for storage. Moreover, the data can be transported from the decentral control unit to the central control unit for storage, and where various calculations can be made.

In the event of the user entering data such as his/her mileage reading or kilometre reading, he/she will be able to ask for other service facilities such as calculations concerning fuel economy, the time at which an oil change will be required, or the time at which a minor or major service inspection should be carried out. The user can be provided with this information via ordinary postal services, but can also be provided over a wireless telephone network to the SMS system, which is a facility coupled with most GSM telephones.

It is envisaged that use of the system will not be limited to ordinary service stations, but will also be able to be used at plants at larger haulage contractors and other fuel tank installations.

What is claimed is:

1. System for establishing automatic access to fuel pumps comprising at least one central control unit and at least one decentral control unit, which decentral control unit controls and activates the fuel pumps chosen, and said decentral control unit including means which regulate the fuel pumps associated with a service station, characterized in that:

said central control unit and said decentral control unit comprise a voice response system;

said central control unit and said decentral control unit comprises means which are activated by the wireless signals transmitted from a mobile telephone;

said means comprise central means for the linking together of a first unique code associated with the mobile telephone with the identification number of the same telephone and the linking together of a number or a code with data stored in the central control unit; and in that the decentral control unit comprises decentral means for linking a code which is unique for the fuel pump and a code entered via the mobile telephone with status associated with the pump, and which are activated by the wireless signals transmitted from the mobile telephone.

2. System according to claim 1, characterized in that the central and decentral control units constitute a total and physically integrated system.

3. System according to claim 1 characterized in that access to the system is established by means of a code which is general for all users.

4. System according to claim 1, characterized in that the central means comprise a computer unit with storage and control units and communication hardware.

5. System according to claim 1, characterized in that the decentral means comprise a computer unit with storage and control units and communication hardware.

6. System according to claim 1, characterized in that with each first unique-code (B) and telephone identification number there is associated a databank which comprises means for the collection and processing of the new data received during the filling up of a vehicle.

7. Method for filling up of a vehicle with fuel comprising the entering of a second code for the activation of a fuel pump and using a system comprising at least one central control unit and at least one decentral control unit, which decentral control unit controls and activates the fuel pumps chosen, and said decentral control unit including means which regulate the fuel pumps associated with a service station, the system characterized in that said central control unit and said decentral control unit comprise a voice response system, means which are activated by the wireless signals transmitted from a mobile telephone, and central means for the linking together of a first unique code associated with the mobile telephone with the identification number of the same telephone and the linking together of a number or a code with data stored in the central control unit; and in that the decentral control unit comprises decentral means for linking a code which is unique for the fuel pump and a code entered via the mobile telephone with status associated with the pump, and which are activated by the wireless signals transmitted from the mobile telephone, the method characterized in that:

before the second code is entered, a general code for the central control unit is entered followed by a first unique code associated with the mobile telephone, the entering of the codes takes place from a mobile and wireless telephone to the voice response system, a wireless signal is transmitted by the mobile telephone, said signal activating the control unit, and the central control unit links the first unique code together with data for this code stored in the central control unit.

8. Method according to claim 7, characterized in that the second code is entered via the mobile telephone and after the first code, said second code activating the decentral unit associated with the fuel pump.

* * * * *